United States Patent
Ali et al.

(10) Patent No.: US 7,548,994 B2
(45) Date of Patent: Jun. 16, 2009

(54) DISK INITIATED ASYNCHRONOUS EVENT NOTIFICATION IN AN INFORMATION HANDLING SYSTEM

(75) Inventors: Ahmad A. J. Ali, Austin, TX (US); Sompong Paul Olarig, Pleasanton, CA (US); Koushik Talukder, Atlanta, GA (US)

(73) Assignee: Dell Products L.P., Round Rock, TX (US)

(*) Notice: Subject to any disclaimer, the term of this patent is extended or adjusted under 35 U.S.C. 154(b) by 311 days.

(21) Appl. No.: 11/418,889

(22) Filed: May 5, 2006

(65) Prior Publication Data

US 2008/0005311 A1    Jan. 3, 2008

(51) Int. Cl.
*G06F 3/00* (2006.01)
*G06F 5/00* (2006.01)

(52) U.S. Cl. .................. 710/5; 710/58; 710/61
(58) Field of Classification Search ............ 710/5, 710/58, 61
See application file for complete search history.

(56) References Cited

U.S. PATENT DOCUMENTS

| 5,050,104 A | 9/1991 | Heyem et al. ............ 345/556 |
| 7,013,336 B1 | 3/2006 | King ........................ 709/224 |

*Primary Examiner*—Niketa I Patel
(74) *Attorney, Agent, or Firm*—Baker Botts L.L.P.

(57) ABSTRACT

A SAS target device, e.g., SAS disk, may instantiate an asynchronous event notification (AEN) transaction while still conforming to SAS protocol standards. When the SAS target has an event queued up for notification to a host controller but there is no host initiated communication going on for the SAS target to attach the notification, then the SAS target may start an AEN timer. If the AEN timer expires and the AEN is still pending, then a request is made to the SAS target to notify the host controller using a SAS PHY level out of band (OOB) mechanism. The OOB message may be sent via a new OOB signal or by sending a COMINIT signal from the SAS disk PHY, requiring a link reset and then using a bit in an IDENTIFY frame for the pending AEN. Receiving and issuing an AEN may then be communicated during PHY initialization.

25 Claims, 5 Drawing Sheets

DISK INITIATED ASYNCHRONOUS EVENT NOTIFICATION IN AN INFORMATION HANDLING SYSTEM

TECHNICAL FIELD

The present disclosure relates generally to information handling systems and, more particularly, to a disk initiated asynchronous event notification in an information handling system.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Storage area network and server systems using redundant array of independent disks (RAID) have been effectively using Serial Attached SCSI (SAS) (SCSI is an abbreviation for "Small Computer System Interface") for transfer of data and control information among the various disk drives and computer servers. SAS offers full duplex, dual-ported serial connections that support the most stringent of high-availability requirements. SAS uses point-to-point serial connections that may be easily scalable for high-speed shared bandwidth connections by integrating the multiple-ported serial connections on a very large scale integrated circuit (VLSI) device.

The disks in the storage area network and server systems have to be polled to discover disk events. Polling of the disks is preferably done when the disks are idle, e.g., not being accessed, or when executing a time consuming background task such as disk self test (DST). Overhead due to disk polling is tolerable when the number of disks is relatively small. However, for an information handling system with a relatively large number of disks, polling may negatively impact the performance of the information handling system and may increase design complexity thereof.

Currently, an asynchronous event notification (AEN) transaction cannot be initiated by a SAS target device, e.g., disk. SAS is based on the third generation architectural model for SCSI devices (SAM-3). Older SCSI systems before SAM-3 had the concept of asynchronous event reporting (AER). For example, the MRIE (method of reporting informational exceptions) bit in the information exceptions mode page in SPC-2 (SCSI primary Commands—2) had one of the settings as AER. Present technology AEN transactions take up valuable time slots in the in-band communications protocols of information handling systems.

SUMMARY

Therefore, there is a need for determining disk events without negatively impacting the performance of an information handling system nor increasing design complexity thereof. Present technology SAS storage disks are expected to be targets only and disk initiated communication to a host controller(s) is not expected nor architected in the design thereof. According to the teachings of this disclosure, a SAS target device may instantiate an asynchronous event notification (AEN) transaction while still conforming to SAS protocol standards and conventional hardware and software infrastructures. This would significantly reduce the amount of time required in polling SAS storage disks by a redundant array of independent disks (RAID) input-output processor (IOP) controller, especially in relatively large storage systems and would not require any major changes in the RAID stack.

When a SAS disk has an event queued up for notification to a host controller but there is no host initiated communication going on for the SAS disk to attach the notification, then the SAS disk may start an AEN timer if one has not already been started, according to teachings of this disclosure. If the AEN timer expires and the notification is still pending, then a request is made to the SAS disk to notify an edge connector (signal and control bus(es)) (of either the SAS expander or controller) using a SAS PHY level out of band (OOB) mechanism. If the SAS edge connector is associated with a SAS expander then the SAS expander will perform BROADCAST (CHANGE), thereby notifying all initiators/controllers in the SAS environment. The SAS expander edge connector will support 1) capturing the AEN from the SAS disk during the IDENTIFY sequence, and 2) returning that AEN within a SMP DISCOVER result frame for each appropriate PHY by using bit positions that are currently reserved. Alternatively, a SAS expander may also use a new/specific primitive instead of BROADCAST (CHANGE) if supported by the SAS system protocol. The OOB message could be sent via a new OOB signal for AEN or by sending a COMINIT signal from the SAS disk PHY, requiring a link reset and then using a bit in an IDENTIFY frame for the pending AEN. Receiving and issuing an AEN may then be communicated during PHY initialization.

According to a specific example embodiment of this disclosure, a method for serial attached SCSI (SAS) target initiated asynchronous event notification (AEN) in an information handling system may comprise: determining arrival of an asynchronous event notification (AEN) from a serial attached SCSI (SAS) target; determining whether a command from a SAS host is pending to the SAS target, wherein if the SAS host command is pending then checking the condition of the SAS target for determining the AEN thereof and then ending, and if the SAS host controller command is not pending then determining whether an AEN timer is running, wherein if the AEN timer is running then determining when the AEN timer expires, and if the AEN timer is not running then starting the AEN timer and determining when the running AEN timer expires, and then determining whether the AEN is still pending, wherein if the AEN is still pending then sending an out-of-band message sequence from the SAS target to the SAS host, and if the AEN is not pending then ending.

According to another specific example embodiment of this disclosure, an information handling system having serial attached SCSI (SAS) target initiated asynchronous event notification (AEN) may comprise: a serial attached SCSI (SAS) host controller; a SAS target, wherein the SAS target is coupled to the SAS host controller with a SAS physical link; wherein the SAS target determines arrival of an asynchronous event notification (AEN) and whether a command from the SAS host controller is pending to the SAS target; wherein if the SAS host controller command is pending to the SAS target, then the SAS host controller checks the AEN of the SAS target, and if the SAS host controller command is not pending to the SAS target, then an AEN timer is started if not already running; wherein when the running AEN timer expires and if the AEN is still pending then the SAS target sends an out-of-band message sequence to the SAS host controller.

According to yet another specific example embodiment of this disclosure, an information handling system having serial attached SCSI (SAS) target initiated asynchronous event notification (AEN) may comprise: a serial attached SCSI (SAS) redundant array of independent disks (RAID) controller; at least one SAS hard disk drive, wherein the at least one SAS hard disk drive is coupled to the SAS RAID controller; wherein the at least one SAS hard disk drive determines arrival of an asynchronous event notification (AEN) and whether a command from the SAS RAID controller is pending to the at least one SAS hard disk drive; wherein if the SAS RAID controller command is pending to the at least one SAS hard disk drive, then the SAS RAID controller checks the AEN of the at least one SAS hard disk drive, and if the SAS RAID controller command is not pending to the at least one SAS hard disk drive, then an AEN timer is started if not already running; wherein when the running AEN timer expires and if the AEN is still pending then the at least one SAS hard disk drive sends an out-of-band message sequence to the SAS RAID controller. At least one SAS expander may be between the SAS RAID controller and the at least one SAS hard disk drive.

BRIEF DESCRIPTION OF THE DRAWINGS

A more complete understanding of the present disclosure thereof may be acquired by referring to the following description taken in conjunction with the accompanying drawings wherein.

Figure 1:
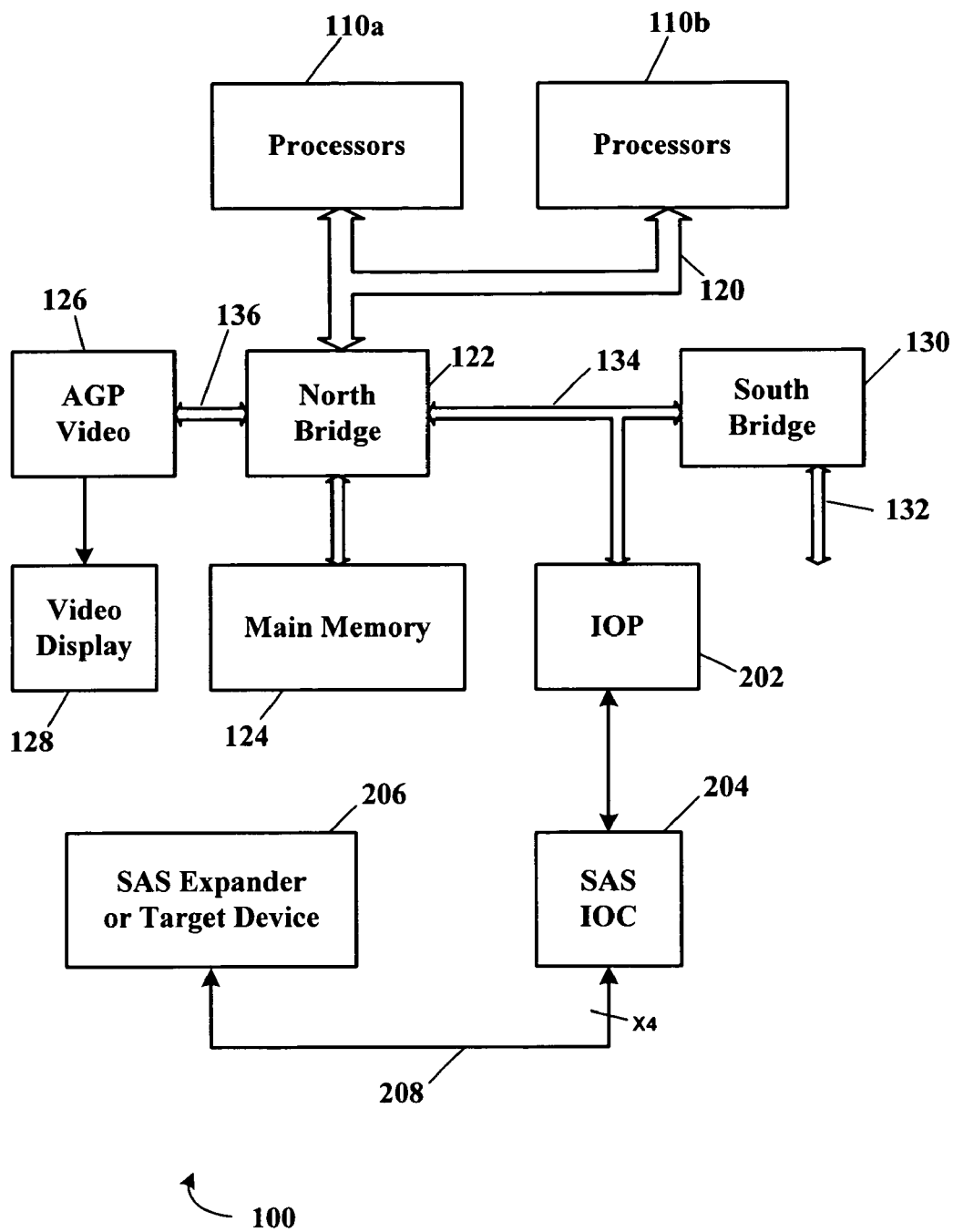
FIG. 1 is a schematic block diagram of an information handling system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of a specific example embodiment is schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses. In one embodiment, the information handling system is a computer system. The information handling system, generally referenced by the numeral 100, comprises a processor(s) 110 coupled to a host bus(es) 120. A north bridge 122, which may also be referred to as a memory controller hub or a memory controller, is coupled to a main system memory 124. The north bridge 122 is coupled to the system processor(s) 110 via the host bus(es) 120. The north bridge 122 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 122. The chip set may also be packaged as an application specific integrated circuit (ASIC). The north bridge 122 typically includes functionality to couple the main system memory 124 to other devices within the information handling system 100. Thus, memory controller functions such as main memory control functions typically reside in the north bridge 122. In addition, the north bridge 122 provides bus control to handle transfers between the host bus 120 and a second bus(es), e.g., PCI bus 134, AGP bus 136 coupled to a video graphics interface 126 which drives a video display 128. A second bus(es) 132 may also comprise other industry standard buses or proprietary buses, e.g., ISA, SCSI, USB buses through a south bridge(s) (bus interface) 130. An input-output processor (IOP) 202 of a SAS RAID adapter is coupled to the north bridge 122. A SAS input-output controller (IOC) 204 is coupled to the IOP 202. The IOC 204 may be coupled to a SAS expander or target device 206, e.g., SAS RAID through, for example, a SAS wide-port physical link 208.

Figure 2:
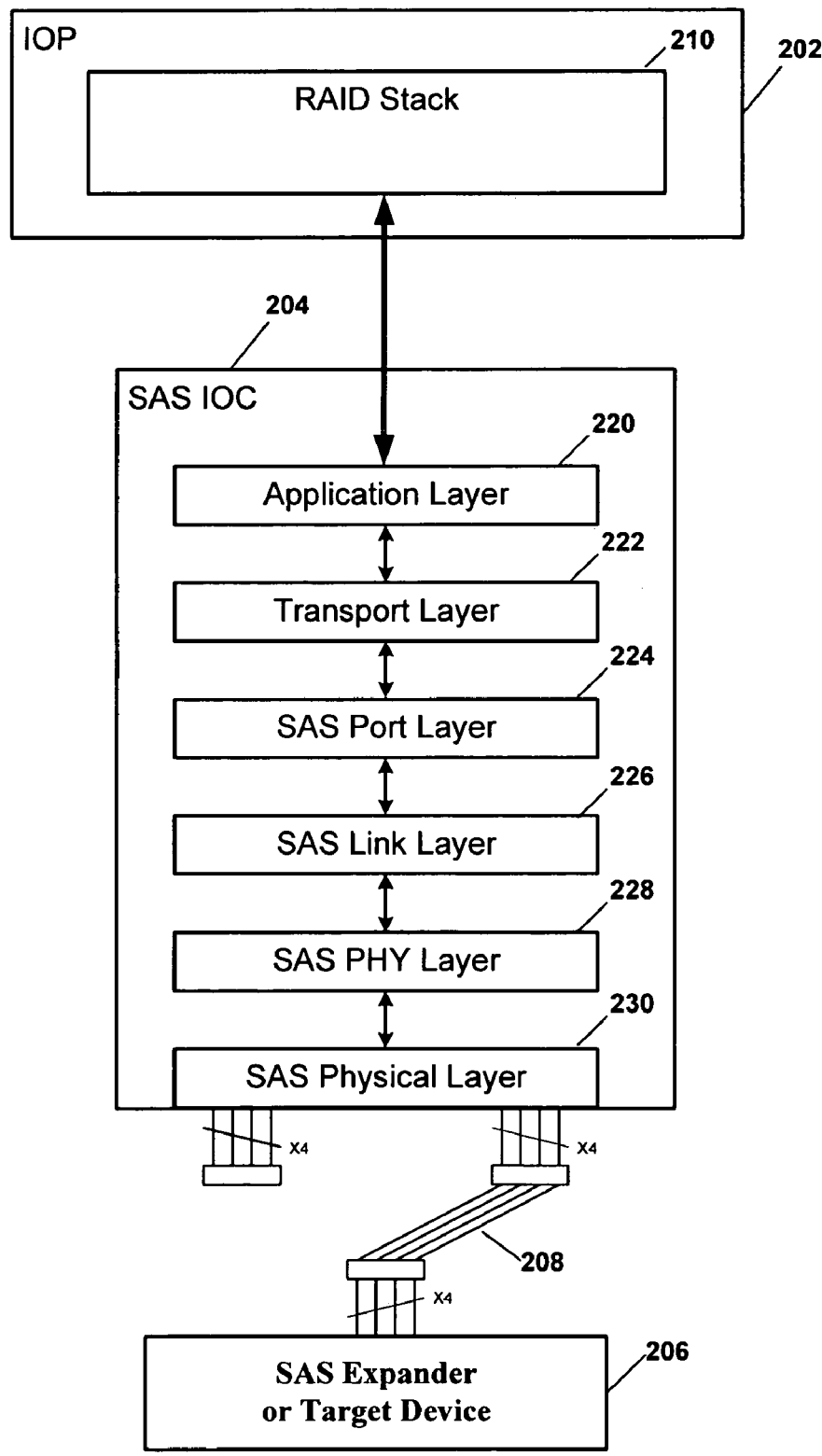
FIG. 2 is a more detailed schematic block diagram of the SAS wide-port shown in FIG. 1.

Referring to FIG. 2, depicted is a schematic block diagram of SAS wide-port shown in FIG. 1. A RAID adapter input-output processor (IOP) 202 comprises a RAID stack 210. An SAS input-output controller (IOC) 204 may be coupled to the IOP 202. The IOC 204 is comprised of an application layer 220, a transport layer 222, a SAS port layer 224, a SAS link layer 226, a SAS PHY layer 228 and a SAS physical layer 230. The SAS physical layer 230 is coupled to the SAS target device 206 with a SAS wide port link 208.

According to the SAS draft standards, the SAS physical layer 230 comprises two sets of differential lines 208, one receive set and one transmit set (4-wires total). The SAS PHY layer 228 connects differential transmitter and receiver circuits to the SAS physical layer 230 which defines the cable, connector and transceiver (receiver/transmitter) characteristics. An SAS external connector accepts up to four (4) physical links, while the connecting cable may couple from one (1) to four (4) physical links. There are two types of ports: (1) narrow ports which communicate over narrow links and contain only one transmit/receive pair per port, and (2) wide ports which communicate over wide links and contain more than one transmit/receive pair (e.g., data bus, data path, etc.). The wide ports reside in the SAS PHY layer 228 and the narrow ports reside in the SAS physical layer 230.

The SAS link layer 226 interfaces between the SAS PHY layer 228 and the SAS port layer. The SAS link layer 226 controls the SAS PHY layer 228 to manage connections with SAS devices 206, including but not limited to SSP, STP and SMP protocols. The SAS port layer 224 communicates with the SAS link layer 226 and associated SAS PHY layer 228. The transport layer 222 interfaces between the SAS port layer 224 and the application layer 220. Generally, there is one transport layer 222 for each type of application layer 220. The IOP 202 is coupled to the IOC 204. The IOP 202 has its own IOP transport layer and IOP application layer (not shown). The IOP application layer is coupled to the RAID stack 210 of the IOP 202. The RAID stack 210 is also coupled to the IOC application layer 220. The SAS target device 206 is coupled to the IOC 204 through wide ports, e.g., more than one transmit/receive pair (4 pairs from the IOC 204 as shown in FIG. 2).

The IOC application layer 220, transport layer 222, SAS port layer 224, SAS link layer 226, SAS PHY layer 228 and SAS physical layer 230 may be implemented in firmware, software, and/or hardware, or any combination thereof. The IOC application layer 220, transport layer 222, SAS port layer 224, SAS link layer 226, SAS PHY layer 228 may be implemented in firmware and the SAS physical layer 230 in hardware. The IOP application and transport layers (not shown) may be implemented in firmware, software, and/or hardware, or any combination thereof. Coupling between the IOP 202 and the SAS IOC 204 may be through hardware buses (separate integrated circuits on a printed circuit board(s), metallic bus connections in a very large scale integrated circuit (VLSI), and/or software instructions in a combination IOP/IOC VLSI microcontroller, microprocessor, application specific integrated circuit (ASIC), programmable logic array (PLA), etc.

Figure 3:
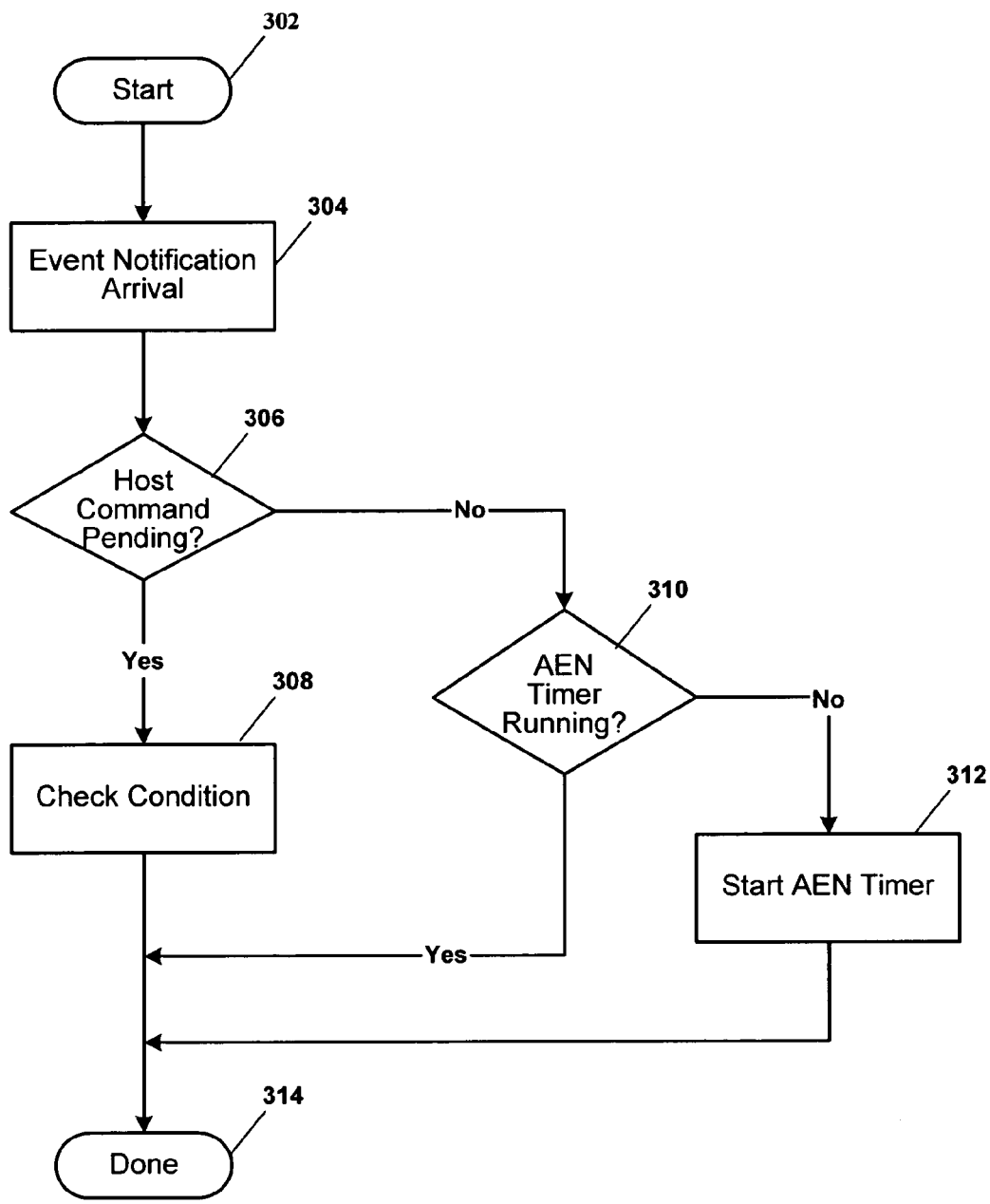
FIG. 3 is a schematic flow diagram for handling arrival of an asynchronous event notification (AEN), according to a specific example embodiment of the present disclosure.

Referring now to FIG. 3, depicted is a schematic flow diagram for handling the arrival of an asynchronous event notification (AEN), according to a specific example embodiment of the present disclosure. Step 302 starts AEN event handling of an AEN. In step 304 the arrival of the AEN is determined, e.g., a SAS disk has an event queued up for notification to a host controller), and in step 306 a determination is made whether a host command is pending, e.g., host initiated communication going on for the SAS disk to attach the AEN. If a host command is pending, then in step 308 the AEN condition is checked, e.g., the AEN is attached to the response to the host initiated communication and in step 314 the event handling of the AEN is done. However, if a host command is not pending, then in step 310 a determination is made whether an AEN timer is running, e.g., started from a previous AEN. If the AEN timer is running then in step 314 the event handling of the AEN is done. (See FIG. 4 for AEN timer expiration.) If in step 310 a determination is made that the AEN timer is not running, then the AEN timer is started in step 312, and in step 314 the event handling of the AEN is done.

Figure 4:
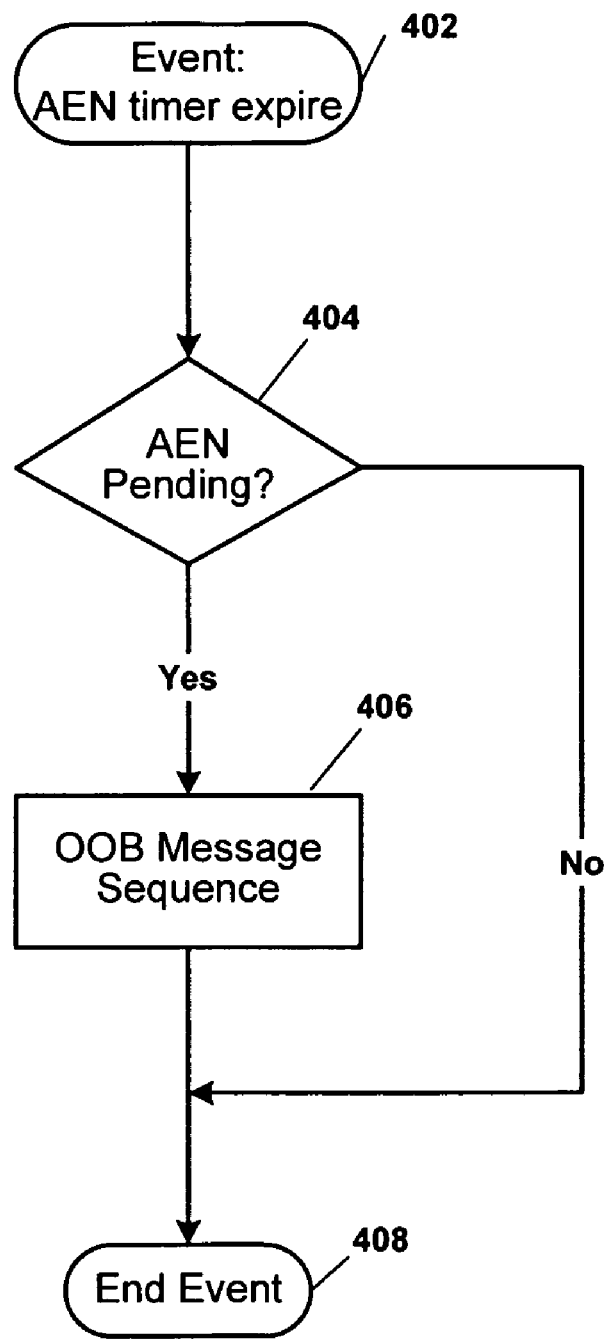
FIG. 4 is a schematic flow diagram for handling asynchronous event notification (AEN) timer expiration, according to a specific example embodiment of the present disclosure.

Referring to FIG. 4, depicted is a schematic flow diagram for handling asynchronous event notification (AEN) timer expiration, according to a specific example embodiment of the present disclosure. Whenever the AEN timer is started in step 312 of FIG. 3, step 402 detects when the AEN timer has expired. Then in step 404 a determination is made whether an AEN is pending. If no AEN is pending then AEN timer handling ends in step 408. However, if an AEN is pending as determined in step 404 then in step 406 an out-of-band (OOB) message sequence is sent from the SAS target to the SAS host for reporting the AEN. Once the OOB message sequence is sent via OOB, then in step 408 the AEN timer handling ends.

Figure 5:
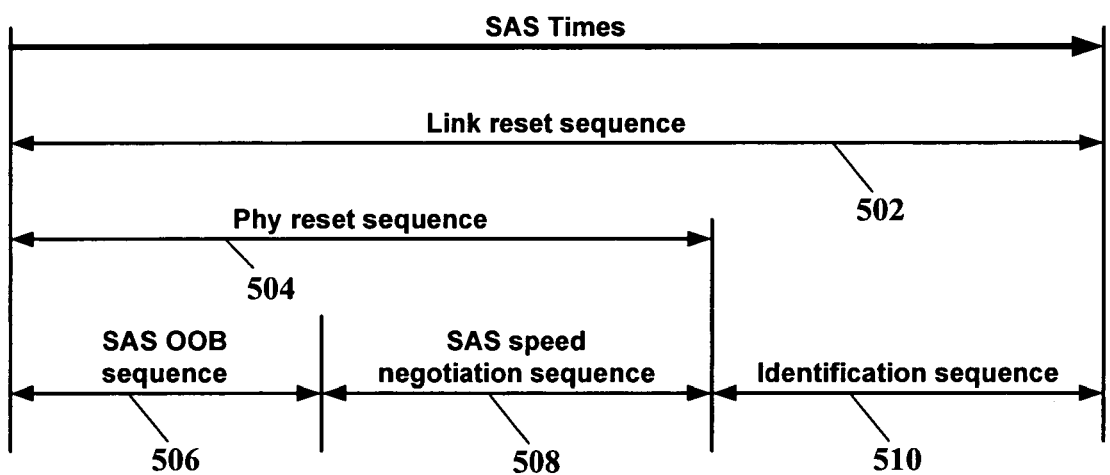
FIG. 5 is a schematic timing diagram of a SAS link reset sequence, according to a specific example embodiment of the present disclosure.

Referring to FIG. 5, depicted is a schematic timing diagram of a SAS link reset sequence 502, according to a specific example embodiment of the present disclosure. During a PHY reset sequence 504, a SAS OOB sequence 506 occurs and subsequently a SAS speed negotiation sequence 508 occurs. The SAS OOB sequence 506 may be started by the SAS target 206 (FIG. 1), e.g., SAS disk, with a SAS COMINIT signal for initiating an AEN. During the identification sequence 508, the SAS host and target communicate and verify the target initiated AEN capability. Also during the identification sequence 508 notification is made of the pending AEN.

The OOB message may be sent via a new OOB signal for AEN or by sending a COMINIT signal from the SAS disk PHY, requiring a link reset and then using a bit in an IDENTIFY frame for the pending AEN. Receiving and issuing an AEN may then be communicated during PHY initialization.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for serial attached SCSI (SAS) target initiated asynchronous event notification (AEN) in an information handling system, said method comprising the steps of:
   A) determining arrival of an asynchronous event notification (AEN) from a serial attached SCSI (SAS) target;
   B) determining whether a command from a SAS host is pending to the SAS target, wherein
      B1) if the SAS host command is pending then checking the condition of the SAS target for determining the AEN thereof and then going to step D2), and
      B2) if the SAS host command is not pending then determining whether an AEN timer is running, wherein B2a) if the AEN timer is running then going to step C), and B2b) if the AEN timer is not running then starting the AEN timer;

C) determining when the running AEN timer expires, and then;

D) determining whether the AEN is still pending, wherein

D1) if the AEN is still pending then sending an out-of-band message sequence from the SAS target to the SAS host, and D2) if the AEN is not pending then ending.

2. The method according to claim 1, wherein the SAS target is an SAS disk.

3. The method according to claim 1, wherein the SAS target is a redundant array of independent disks (RAID).

4. The method according to claim 1, wherein the SAS target is an SAS expander.

5. The method according to claim 1, wherein the SAS host is a SAS controller of a network storage device.

6. The method according to claim 1, wherein the SAS host is a SAS controller of network server system.

7. The method according to claim 1, wherein the out-of-band message is sent from the SAS target during a Phy reset sequence.

8. The method according to claim 7, wherein a SAS COMINIT signal initiates sending the out-of-band message.

9. The method according to claim 7, wherein a SAS speed negotiation sequence occurs after an SAS out-of-band sequence.

10. The method according to claim 9, wherein the SAS out-of-band sequence and SAS speed negotiation sequence occur during the Phy reset sequence.

11. The method according to claim 7, wherein the steps of receiving and issuing the AEN are communicated between the SAS target and host during a PHY initialization.

12. An information handling system having serial attached SCSI (SAS) target initiated asynchronous event notification (AEN), said system comprising:

a serial attached SCSI (SAS) host controller;

a SAS target, wherein the SAS target is coupled to the SAS host controller with a SAS physical link;

wherein the SAS target determines arrival of an asynchronous event notification (AEN) and whether a command from the SAS host controller is pending to the SAS target;

wherein if the SAS host controller command is pending to the SAS target, then the SAS host controller checks the AEN of the SAS target, and if the SAS host controller command is not pending to the SAS target, then an AEN timer is started if not already running;

wherein when the running AEN timer expires and if the AEN is still pending then the SAS target sends an out-of-band message sequence to the SAS host controller.

13. The system according to claim 12, wherein the SAS host controller is a SAS input-output controller (IOC).

14. The system according to claim 12, wherein the SAS target is a SAS hard disk drive.

15. The system according to claim 12, wherein the SAS target is a redundant array of independent disk (RAID) drives.

16. The system according to claim 12, wherein the SAS target is an SAS expander.

17. The system according to claim 12, wherein the SAS host controller is part of a network storage device.

18. The system according to claim 12, wherein the SAS host controller is part of a network server system.

19. The system according to claim 12, wherein the out-of-band message is sent by the SAS target during a Phy reset sequence.

20. The system according to claim 19, wherein a SAS COMINIT signal initiates sending the out-of-band message.

21. The system according to claim 19, wherein a SAS speed negotiation sequence occurs after an SAS out-of-band sequence.

22. The system according to claim 21, wherein the SAS out-of-band sequence and SAS speed negotiation sequence occur during the Phy reset sequence.

23. The system according to claim 19, wherein the steps of receiving and issuing the AEN are communicated between the SAS target and host during a PHY initialization.

24. An information handling system having serial attached SCSI (SAS) target initiated asynchronous event notification (AEN), said system comprising:

a serial attached SCSI (SAS) redundant array of independent disks (RAID) controller;

at least one SAS hard disk drive, wherein the at least one SAS hard disk drive is coupled to the SAS RAID controller;

wherein the at least one SAS hard disk drive determines arrival of an asynchronous event notification (AEN) and whether a command from the SAS RAID controller is pending to the at least one SAS hard disk drive;

wherein if the SAS RAID controller command is pending to the at least one SAS hard disk drive, then the SAS RAID controller checks the AEN of the at least one SAS hard disk drive, and if the SAS RAID controller command is not pending to the at least one SAS hard disk drive, then an AEN timer is started if not already running;

wherein when the running AEN timer expires and if the AEN is still pending then the at least one SAS hard disk drive sends an out-of-band message sequence to the SAS RAID controller.

25. The system according to claim 24, further comprising at least one SAS expander between the SAS RAID controller and the at least one SAS hard disk drive.

* * * * *